United States Patent [19]

Briston et al.

[11] 4,093,686

[45] June 6, 1978

[54] SHEET MATERIALS

[75] Inventors: Rodney J. Briston, Blackburn; Rodger G. Canning, Chorley, both of England

[73] Assignee: Reed International Limited, London, England

[21] Appl. No.: 723,304

[22] Filed: Sep. 14, 1976

Related U.S. Application Data

[63] Continuation of Ser. No. 592,039, Jun. 30, 1975, abandoned.

[30] Foreign Application Priority Data

Jul. 1, 1974 United Kingdom .............. 29145/74

[51] Int. Cl.² .............................................. B29D 27/00
[52] U.S. Cl. ..................... 264/45.5; 156/79; 264/45.8; 264/DIG. 82; 427/264; 427/307; 427/373; 428/159; 428/161; 428/165
[58] Field of Search ............. 264/DIG. 82, 45.5, 45.8; 427/307, 264, 307, 373; 428/159, 161, 165; 156/79

[56] References Cited

U.S. PATENT DOCUMENTS

| 3,464,934 | 9/1969 | Birkett et al. ............... 264/DIG. 82 |
| 3,552,997 | 1/1971 | Powell et al. ............... 264/DIG. 82 |
| 3,574,070 | 4/1971 | Sahely ............................. 427/307 X |
| 3,650,914 | 3/1972 | Lin ................................... 427/307 X |
| 3,660,187 | 5/1972 | Shortway et al. .......... 264/DIG. 82 |
| 3,772,138 | 11/1973 | Witman ............................ 428/159 |

FOREIGN PATENT DOCUMENTS

| 1,147,983 | 4/1969 | United Kingdom ........ 264/DIG. 82 |
| 1,069,998 | 5/1967 | United Kingdom ........ 264/DIG. 82 |

*Primary Examiner*—Philip Anderson
*Attorney, Agent, or Firm*—Bacon & Thomas

[57] ABSTRACT

A process for the manufacture of a differentially expanded sheet material comprises applying an organic solvent to the surface of an expandable thermoplastic sheet containing a blowing agent and allowing the treated sheet to at least partially dry before a composition comprising an ink and a kicker for the blowing agent is applied to selected areas of the treated surface. The sheet is then heated so that differential expansion occurs.

11 Claims, 5 Drawing Figures

SHEET MATERIALS

This application is a continuation of application Ser. No. 592,039, filed June 30, 1975 and now abandoned.

This invention is concerned with improvements in the manufacture of sheet materials having a relief effect. In particular the present invention is concerned with the production of sheet materials by the differential expansion of areas of a thermoplastic sheet. The sheet materials so formed possess utility as, for example, wall-coverings, floor coverings, decorative laminates and decalcomania.

The production of sheet materials having a relief effect by differential expansion of a thermoplastic sheet offers the important advantage that, in the manufacturing process, the use of embossing rolls may be eliminated. Thus, while the effect of an embossing roll is to physically alter the surface character of the sheet material, a similar appearance may be obtained by chemical means if selected areas of the sheet material are expanded to a different degree.

Expansion of a thermoplastic sheet may be effected by incorporating a blowing agent in the sheet and heating the sheet to a temperature at which decomposition of the blowing agent occurs. The blowing agent is conveniently dispersed in the thermoplastic material prior to formation of the sheet thereby ensuring thorough distribution of the blowing agent in the sheet. Differential expansion of the thermoplastic sheet may be achieved with the aid of a "kicker". Kickers are well known in the art and their effect is to lower the decomposition temperature of certain blowing agents. If a kicker is in association with the blowing agent in certain areas only of the sheet, depression of the decomposition temperature of the blowing agent is obtained in only those areas. Hence a greater degree of expansion of those areas of the sheet containing kicker will be obtained than those areas not containing kicker when the sheet is heated to a given temperature for a suitable time.

Differential expansion of an expandable thermoplastic sheet material containing a blowing agent may be obtained by applying a kicker to certain areas only of the surface of the sheet before heating the sheet to achieve expansion. Application of a kicker to the surface of the sheet possesses attractive advantages since the sheet containing the blowing agent may be formed in one operation and the need to incorporate a kicker into selected parts of the sheet-forming mix is eliminated. Furthermore the use of complicated printing techniques involving the application of chosen inks to those areas of the sheet containing kicker is obviated because, if desired, the kicker may be applied together with an ink. Indeed the difficulty of registering kicker and ink when they are applied separately to the sheet is such as to direct one, in most circumstances, to apply them together.

In our experience however when the kicker is applied together with an ink to the surface of an expandable thermoplastic sheet the adhesion of the ink to the thermoplastic sheet is inadequate during subsequent treatment of the sheet. In particular, when multi-colour printing is employed ink from one printing station has a tendency to pick-off at a subsequent printing station or onto a path roller. Moreover the adhesion of the ink to the thermoplastic sheet has to be sufficient to withstand handling between printing and expansion which may or may not be in-line. If the adhesion of the ink is inadequate prior to expansion of the thermoplastic sheet removal of ink may occur during processing of the sheet material thus resulting in an inferior product.

We have now found that the ink adhesion obtained in the production of a differentially expanded thermoplastic sheet may be significantly improved by applying an organic solvent possessing an affinity for the thermoplastic material to the surface of the sheet before applying the kicker. The organic solvent is preferably applied in combination with a resinous binder as a lacquer in which case it will form at least part of the solvent phase. The advantage of applying a lacquer is that, with one coating, the thermoplastic sheet may be treated with the organic solvent and with one or more additional agents present in the lacquer such as, for example, a silica or silicate matting agent, a pigment or a metallic powder.

According to one feature of the present invention therefore there is provided a process for the preparation of a differentially expanded sheet material which comprises applying an organic solvent to the surface of an expandable thermoplastic sheet containing a blowing agent and allowing the treated sheet to at least partially dry, applying a composition comprising an ink and a kicker for the blowing agent to selected areas of the treated surface and heating the sheet to a temperature at which the blowing agent in contact with kicker decomposes and retaining the sheet at this temperature for a suitable time so that those areas of the sheet in contact with the kicker are expanded to a greater extent than those areas not in contact with the kicker.

Satisfactory expansion through the full depth of the sheet is dependent upon migration of the kicker through the depth of the sheet. Hence, the application of a solvent and, in particular, a lacquer prior to applying the kicker may be thought to provide an additional physical barrier to the desired migration of the kicker. It is, however an additional and unexpected advantage of the process according to the invention that the improvement in ink adhesion may be obtained without any significant reduction in the quality of the relief effect.

It is believed that treatment of the surface of the sheet with the chosen solvent causes some etching of the surface thereby improving adhesion of the ink to the sheet and the presence of the solvent facilitates migration of the subsequently applied kicker into the depth of the thermoplastic sheet. The chosen solvent may be applied over the whole surface of the sheet or to only those areas which are to be subsequently printed with ink containing the kicker.

The process according to the invention is of particular value in the production of wall coverings since the thermoplastic sheet material may be formed as an unsupported sheet or as a coating on paper, a non-woven synthetic fibre web, a spunbonded web or another suitable base. Differential expansion of the thermoplastic material results in the formation of a sheet having a visually attractive appearance which is well suited to decoration of a wall or ceiling. The process according to the invention is however not limited to the production of wall coverings and the sheet materials may also find utility as floor coverings, decorative laminates, display stickers and decalcomania. In the production of floor coverings the thermoplastic sheet will ordinarily be formed on a relatively substantial base which may be a suitable plastics material, a felted sheet, or a woven or knitted fabric formed, for example from natural or synthetic fibres.

The thermoplastic sheet may be formed of any convenient expandable synthetic resinous material. Preferred materials include polymers of vinyl chloride or copolymers of vinyl chloride and another copolymerisable monomer such as vinyl acetate or an acrylic or methacrylic monomer such as an ester of acrylic or methacrylic acid or acrylic or methacrylic acids themselves. The expandable sheet may be formed from a plastisol in which case the thermoplastic polymer or copolymer will be mixed with a blowing agent, a stabiliser having controlled catalytic action with the blowing agent under the chosen processing conditions, a plasticiser which may be any of the usual phthalate compounds and pigments or extenders. The plastisol is formed into a sheet in any convenient manner and may, for example, be applied to a base web of paper or like substance as discussed above, the weight of plastisol being for example, from 40 to 800 g/m².

The precise choice of blowing agent will depend upon the particular thermoplastic material employed and, its decomposition temperature in the presence of the kicker should be appropriate to the thermoplastic material. Blowing agents are well known and have been described in the literature. Suitable blowing agents include azobis-formamide and azobis-isobutyronitrile. The blowing agent may conveniently be present in the thermoplastic sheet in amounts of up to 15%, e.g. 1 to 15%, preferably from 3 to 9%, by weight based on the weight of the expandable, synthetic resinous material.

An alternative technique for use in the production of the expandable thermoplastic sheet is hot melt coating. This technique may be applied to a wide range of materials such as polyethylene, polyvinyl chloride, polyester and acrylic polymers.

Application of the solvent may be made in any convenient manner and satisfactory results are achieved simply by wetting the thermoplastic sheet with the chosen solvent. Since the function of the solvent appears to be, in part at least, to etch the surface of the sheet the solvent should be chosen according to the character of the thermoplastic material. Thus, in the case of expandable thermoplastic sheets based upon polymers of vinyl chloride or copolymers of vinyl chloride and another copolymerisable monomer, we prefer that the organic solvent should be polar since such solvents usually possess a greater affinity for the thermoplastic material than do non-polar solvents.

Suitable solvents for application to the thermoplastic sheet include hydroxylic compounds for example mono- and polyhydric alcohols; aliphatic and alicyclic ethers such as tetrahydrofuran; esters such as ethylacetate or isopropyl acetate; glycol ethers; glycol esters such as 2-ethoxyethyl acetate; aliphatic and alicyclic ketones such as methyl ethyl ketone, methyl isobutylketone or cyclohexanone; halogenated hydrocarbons in particular chlorinated aliphatic hydrocarbons; nitro compounds such as nitro propane or nitrobenzene; and Lewis bases such as substituted amides for example dimethylformamide and dimethylacetamide and di(-loweralkyl)sulphoxides for example dimethylsulphoxide. The aforesaid solvents should, in general, have from 1-20 carbon atoms and preferably will contain from 1-10 carbon atoms.

There may be advantages associated with the use of strongly polar solvents in certain cases and, in such cases it may be desirable to use the chosen solvent in conjunction with a less polar or non-polar solvent. The latter material serves as a diluent for the polar solvent and may conveniently be a hydrocarbon such as toluene, xylene or methylated spirits.

In the particular case of thermoplastic sheets formed of vinyl chloride homopolymers and copolymers we have found aliphatic ketones such as methyl ethyl ketone and aromatic hydrocarbons such as toluene or xylene to be advantageous solvents to use.

The rate of application of the chosen solvent to the expandable thermoplastic sheet will depend upon the method of application used. In general a rate of application of from 10 to 700 g/sq.m, preferably 30 to 500 g/sq.m, will yield satisfactory results. In the particular case of application of the solvent by gravure printing the rate of application may be from 25 to 300 g/sq.m, preferably from 50 to 150 g/sq.m.

As stated above the chosen solvent may be applied as the solvent phase of a lacquer. The use of a lacquer is a convenient way of treating the surface of the thermoplastic material with an additional component such as a matting agent or pigment. The heat treatment in the expansion step may produce a glossy surface on the resulting sheet and it may be desirable to introduce a matting agent to reduce this effect. The lacquer may contain, as binder, any suitable resin such as a polymer or copolymer of ethylenically unsaturated monomers for example vinyl and/or acrylic or methacrylic monomers. Other suitable binders for the lacquer include polyurethanes, polyesters and epoxy resins. The lacquer may be applied by any of the well-known techniques such as gravure, roller coating, screen printing or flexographic printing and since these methods may also be used to apply the composition containing a kicker the whole technique readily lends itself to an in-line industrial operation.

We particularly prefer to employ gravure rollers in the application of a lacquer to the surface of the thermoplastic sheet. The gravure rollers will preferably be engraved with 80 to 200 lines per linear inch.

The kicker composition may include the chosen kicker as a solution or suspension in an ink. The composition will thus, typically, include the kicker in admixture with a pigment, binder and dispersed phase. The kicker will ordinarily be a compound of zinc, cadmium or lead and conveniently the kicker will be a salt of zinc, cadmium or lead although other compounds of the chosen metals may be employed such as, for example, zinc oxide. Zinc, cadmium or lead salts may be formed of inorganic or organic acids. Inorganic acids which may be used in salt formation include hydrochloric and nitric acids whilst suitable organic acids include carbonic, oxalic, acetic, lactic, citric, formic, sebacic, octanoic, stearic, phthalic and benzoic acids. The ink composition will conveniently contain up to 25% by weight of the kicker preferably from 5 to 20% by weight. A convenient kicker to employ is zinc octoate.

The solvent for the ink may be any of the usual solvents for inks employed in the production of printed wall coverings. Thus, for example, ketones such as methyl ethyl ketone; esters such as 2-ethoxyethyl acetate; nitro compounds such as nitropropane; and hydrocarbons such as toluene may all be used with advantage. The pigment content of the ink will vary according to the precise pigment chosen. However, effective results will generally be achieved with ink compositions containing up to 20% preferably 5–15% by weight of pigment.

Formulation of the kicker composition will depend upon the precise manner in which the ink is to be printed onto the treated sheet material. The kicker composition may however be applied with equal advantage in printing using any of the conventional techniques such as those listed above for application of the lacquer.

As mentioned above the expandable thermoplastic sheet is preferably formed from a plastisol and in the case of such sheet materials the degree of gelation of the expandable sheet materials at the time of application of the organic solvent and the kicker is important. Thus, if the degree of gelation is too low the surface character of the sheet will be destroyed during the application of the solvent, especially if such application involves passage of the sheet through the nip of printing rollers. Conversely, if the degree of gelation is too great it will be difficult to obtain satisfactory expansion of the sheet. Satisfactory gelation of the sheet may be achieved by heating it to 110°–140° C for a relatively short period of time. A few minutes heating at low temperatures is generally sufficient while heating for less than a minute may be adequate at higher temperatures.

Expansion of the printed thermoplastic sheet may take place as an in-line operation after the printing steps. Alternatively the printed sheets may be stacked as sheets or wound on to a reel and expanded subsequently. In this latter case there may be a tendency for kicker from one sheet to migrate into adjacent stacked or wound sheets causing undesired expansion in areas of those adjacent sheets.

The thermoplastic sheet may be provided with a coating which is impervious to the kicker after the printing step in order to avoid this problem and the impervious layer may be applied either to the back or to the front of the sheet before it is stacked or reeled. The layer is preferably applied as a transparent lacquer to the top face of the unprinted sheet printed the final printing step. Application of the impervious layer to the top face is preferred because, in addition to providing a barrier to migration of the kicker, such a coating may serve as a wear layer to protect the sheet in use. Moreover, application of a lacquer in a final step after printing may provide a convenient means of introducing a further agent to the surface of the sheet such as, for example, a matting agent.

If desired the sheet material obtained by the process according to the invention may be presented with a coating of adhesive on the side for application to a substrate. For example, in the particular case of wall coverings the side of the sheet material to be applied to the wall or ceiling may be provided with a coating of a water-activatable adhesive. The adhesive coating may be provided at any convenient point in the manufacture of the sheet material.

In the case of water-activatable adhesives the coating may be applied as an aqueous solution dispersion or emulsion to the surface of the sheet and dried. Adhesive may be applied at the rate of 2 to 30 grams/square meter of surface area and the adhesive may be a natural or synthetic resinous material, a vegetable gum, a soluble starch or starch ether or other suitable material.

It may be preferable to incorporate into the adhesive coating other ingredients such as for example surface active agents to improve the water-absorption properties of the adhesive coating and fungicides to inhibit mould growth.

The process according to the invention may be used in the preparation of sheet materials having the most variegated effects. Thus, for example, two or more applications of a kicker composition may be made to different areas of the surface of the sheet after the treatment with a solvent. Different pigments may be employed in the different kicker compositions which, moreover, may contain differing concentrations of kicker. After expansion of such a sheet a product is formed in which a variety of degrees of expansion have been obtained giving a product having a pleasing decorative effect.

In order that the invention may be well understood the production of a sheet material according to one preferred mode of operation according to the invention will be described by way of illustration only with reference to the accompanying drawings.

It should be understood that FIGS. 1–5 are purely diagrammatic and no attempt is made therein to show the relative thicknesses of the various layers that compose the sheet material.

Figure 1:
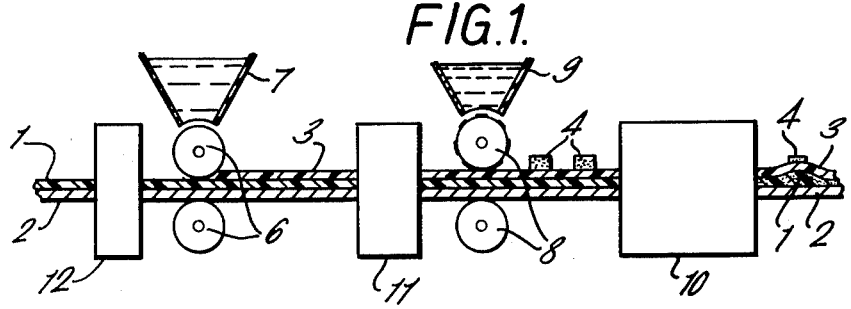
FIG. 1 illustrates one method of producing a sheet material according to the invention on-line.
Figure 2:
FIG. 2 is an enlarged partial longitudinal section of an expandable thermoplastic sheet.
Figure 3:
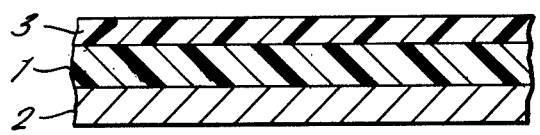
FIG. 3 is a section of the sheet shown in FIG. 2 carrying a coating of a lacquer.

An expandable thermoplastic layer 1 is applied as a plastisol to a sheet of suitable paper 2 and partially gelled by the oven 12 to produce a sheet material as shown in FIG. 2. The sheet material so formed is presented to the nip between a pair of rolls 6 as shown in FIG. 1 and receives a coating of a lacquer 3 from a bath 7 whereafter it is partially dried by oven 11 to produce a lacquered sheet as shown in FIG. 3. The lacquer contains a dispersion of a matting agent in a solution of a vinyl chloride homo- or copolymer in an organic solvent possessing an affinity for the thermoplastic sheet. Suitable lacquers are described more fully in Examples 1 and 2 below.

The lacquered sheet then proceeds to the nip between a pair of conventional printing rolls 8 and ink from bath 9 is applied to certain areas only of the lacquered surface of the sheet. The ink contains a pigment and a kicker appropriate to the blowing agent present in the thermoplastic layer 1 and formulations for such inks are described more fully in Examples 1 and 2 below. The sheet material is then of an appearance as shown in FIG. 4 and has a number of discreet areas 4 coated with kicker-containing ink.

Figure 4:
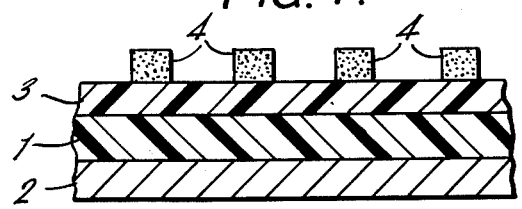
FIG. 4 is a section of the sheet shown in FIG. 3 after application of an ink to the treated surface.
Figure 5:
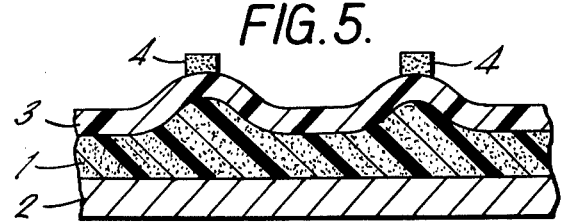
FIG. 5 is a section of the sheet shown in FIG. 4 after expansion.

The printed sheet shown in FIG. 4 then passes on to an oven 10 wherein the sheet attains a temperature intermediate between the decomposition temperature of the blowing agent and a mixture of the blowing agent and the kicker. Differential expansion is thereby obtained to form a product, as shown in FIG. 5, in which those portions of the sheet that received an application of kicker-containing ink are expanded to a greater extent than those portions of the sheet which received no such coating. The resulting sheet material is visually attractive and may be used as a wall covering.

In order that the invention may be further understood the following examples are given by way of illustration only. In the examples parts referred to are parts by weight.

EXAMPLE 1

(a) Preparation of expandable thermoplastic sheet
A mix comprising

| | |
|---|---|
| Polyvinyl chloride | 100 parts |
| Dicapryl phthalate (plasticizer) | 65 parts |
| Organo-tin stabiliser | 1 part |
| Epoxidised oil stabiliser | 6 parts |
| Azobis-formamide | 6 parts |
| Titanium dioxide | 40 parts |
| White spirit | 5 parts | was applied by means of a doctor blade at a thickness of 0.2 mm and a dried weight of 190 gm/m² on to 90 gm/m² Paper. The coating was gelled at a temperature of 120°–130° C for 60 seconds to yield an expandable thermoplastic sheet (b) Treatment of expandable sheet with solvent
A lacquer was prepared by dispersing the following formulation:

| | |
|---|---|
| Vinyl chloride/vinyl acetate copolymer | 18 parts |
| Silica matting agent | 8 parts |
| Methyl ethyl ketone | 40 parts |
| Xylene | 10 parts |
| Toluene | 24 parts |

The viscosity of the lacquer was adjusted by addition of methyl ethyl ketone to 30 seconds (as measured on Ford No. 4 Cup) and the lacquer was then applied to the surface of the gelled polyvinyl chloride sheet prepared in (a) using a gravure roller engraved with 140 lines per linear inch. After partial drying the following ink composition was applied to the treated sheet:

| | | |
|---|---|---|
| Vinyl chloride polymer in methyl ethyl ketone | 24 | parts |
| 2-Ethoxyethyl acetate | 2.5 | parts |
| Toluene | 13 | parts |
| Zinc octoate | 24 | parts |
| Pigment | 7 | parts |

If necessary the viscosity of the ink was adjusted to 30 seconds (as measured by Ford No. 4 Cup) by addition of methyl ethyl ketone. The ink was applied in a chosen pattern using a gravure roller engraved with 120 lines per linear inch and blown at 200° C for one minute after an interval of 20 hours.

The product obtained had an expansion in the inked areas of more than 0.012 inches relative to the unprinted areas and a satisfactory degree of mattness which combined to give the material a visually attractive appearance. Moreover the product showed good ink adhesion.

EXAMPLE 2

A lacquer was prepared by dispersing the following formulation:

| | |
|---|---|
| Polyvinyl chloride | 18 parts |
| Silica matting agent | 15 parts |
| Titanium dioxide | 36 parts |
| Methyl ethyl ketone | 23 parts |
| Toluene | 8 parts |

The viscosity of the lacquer was adjusted by addition of methyl ethyl ketone to 30 seconds (as measured on Ford No. 4 Cup) and the lacquer was then applied to the surface of a thermoplastic sheet prepared as described in Example 1 (a). Application was effected using a gravure roller engraved with 100 lines per linear inch and thereafter the following ink composition was applied to the treated sheet:

| | |
|---|---|
| Polyvinyl chloride | 18 parts |
| Pigment | 9 parts |
| 2-Nitropropane | 40 parts |
| Methyl ethyl ketone | 8 parts |
| Toluene | 24 parts |
| Zinc octoate | 18 parts |

If necessary the viscosity of the ink was adjusted to 30 seconds (as measured on Ford No. 4 Cup) by addition of methyl ethyl ketone. The ink was applied in a chosen pattern using a gravure roller engraved with 150 lines per linear inch and blown at 200° C for one minute after an interval of 7 days.

The product obtained had an expansion in the inked areas of greater than 0.015 inches relative to the unprinted areas and a satisfactory degree of mattness. The material was visually attractive and the ink adhesion of the product was good.

EXAMPLES 3–16

Sheet materials were prepared in these Examples in a manner analogous to that described in Examples 1 and 2. Examples 3–16 illustrate the application of the invention when differing expandable thermoplastics materials, solvents and kickers are used in the process according to the invention.

(a) Preparation of expandable thermoplastic sheets A and B

The following mixes were applied by means of a doctor blade at a thickness of 0.13 mm and a dried weight of 180 gm/m² on to 90 gm/m² paper.

| Sheet | A | B |
|---|---|---|
| Polyvinyl chloride homopolymer | 100 | — |
| Vinyl chloride-vinyl acetate copolymer | — | 100 |
| Dicapryl phthalate | 65 | 65 |
| Organo-tin stabiliser | 1 | 1 |
| Epoxidised oil stabiliser | 6 | 6 |
| Azobis-formamide | 6 | 6 |
| Titanium dioxide | 40 | 40 |
| White spirit | 5 | 5 |

The coatings were gelled at 120° C for 60 seconds.

(b) Treatment of Sheets A and B with solvents
The following solvents and lacquers were prepared for treatment of sheets A and B.

| Solvent/lacquer No. | 1 | 2 | 3 | 4 | 5 | 6 | 7 | 8 |
|---|---|---|---|---|---|---|---|---|
| Vinyl chloride-vinyl acetate copolymer | — | — | 23 | 23 | 20 | — | 17 | 12 |
| Acrylic resin | — | — | — | — | — | 20 | — | 13 |
| Silica matting agent | — | — | — | 20 | — | 20 | — | 8 |
| Coloured pigment | — | — | — | — | — | — | 10 | 6 |
| Titanium dioxide | — | — | — | — | — | — | — | 36 |
| Methyl ethyl ketone | — | 50 | — | 115 | 100 | 80 | 85 | 107 |
| Toluene | — | — | — | — | 55 | 25 | 62 | 48 |
| Cyclohexanone | — | 20 | — | 30 | — | 10 | — | — |
| Ethyl acetate | — | — | 138 | — | — | — | — | — |
| iso Propyl acetate | — | — | 90 | — | — | — | — | — |
| 2-Ethoxyethyl acetate | — | — | — | — | — | 8 | — | 13 |
| 2-Nitro propane | 25 | — | — | 20 | — | — | — | — |
| Tetrahydrofuran | 75 | — | — | — | — | — | — | — |

The solvent or lacquer was applied to gelled sheets A and B using a gravure roller engraved with 150 lines per linear inch. After partial drying the following ink compositions were applied to the treated sheets:

| Ink No. | I | II | III | IV |
|---|---|---|---|---|
| Vinyl chloride-vinyl acetate copolymer | — | — | 17 | 17 |
| Acrylic resin | 13 | 13 | — | — |
| Lead octoate | — | — | — | 20 |
| Cadmium octoate | — | 14 | — | — |
| Zinc octoate | — | — | 17 | — |
| Zinc benzoate | 20 | — | — | — |
| Methyl ethyl ketone | 46 | 50 | 64 | 68 |
| Toluene | 28 | 23 | 31 | 29 |
| 2-Ethoxyethyl acetate | 8 | 8 | — | — |
| Pigment | 13 | 13 | 10 | 10 |

All inks were applied at a viscosity of 25 seconds (as measured on Ford No. 4 Cup), viscosities being adjusted by addition of methyl ethyl ketone if necessary. Inks were applied using a gravure roller engraved with 150 lines per linear inch and blown at 200° C for one minute after an interval of 24 hours.

The Examples and the properties of the resulting expanded sheets are set out in the following Table.

| Example No. | Sheet No. | Solvent/ lacquer No. | Ink No. | Contrast[1] in mm | Ink Adhesion |
|---|---|---|---|---|---|
| 3 | A | 1 | I | 0.35 | Good |
| 4 | A | 6 | II | 0.17 | " |
| 5 | A | 7 | III | 0.40 | " |
| 6 | A | 8 | IV | 0.30 | " |
| 7 | A | 3 | IV | 0.31 | " |
| 8 | A | 5 | III | 0.47 | " |
| 9 | A | 4 | III | 0.45 | " |
| 10 | A | 1 | IV | 0.35 | " |
| 11 | B | 8 | I | 0.20 | " |
| 12 | B | 3 | II | 0.06 | " |
| 13 | B | 5 | IV | 0.18 | " |
| 14 | B | 2 | II | 0.08 | " |
| 15 | B | 1 | III | 0.36 | " |
| 16 | B | 4 | IV | 0.21 | " |

[1]Contrast is a measure of the difference in the expansion in the inked areas relative to the unprinted areas. The products obtained in Examples 4,6,9,11 and 16 were matt.

(1) Contrast is a measure of the difference in the expansion in the inked areas relative to the unprinted areas.

The products obtained in Examples 4, 6, 9, 11 and 16 were matt.

We claim:

1. A process for the manufacture of a differentially expanded resinous cellular sheet, comprising incorporating a heat decomposable blowing agent in a thermoplastic resinous composition; forming a sheet from said resinous composition; applying a lacquer, wherein at least part of the solvent phase of said lacquer is an organic solvent having an affinity for said resinous composition, to the surface of said resinous sheet containing said blowing agent and allowing said treated sheet to at least partially dry; applying a printing ink composition containing a kicker which depresses the decomposition temperature of said blowing agent to portions of said treated surface; and uniformly heating said treated sheet for a time and at a temperature so that those portions of the sheet which received an application of printing ink composition expand to a greater extent than those portions which did not receive an application of printing ink composition to produce said differentially expanded sheet.

2. A process as defined in claim 1 wherein said organic solvent is an aliphatic or alicyclic ether, an ester, a glycol ester, an aliphatic or alicyclic ketone or a nitro compound.

3. A process as defined in claim 2 wherein said organic solvent is methyl ethyl ketone.

4. A process as defined in claim 1 wherein said organic solvent is a mixture of a polar solvent and a nonpolar solvent.

5. A process as defined in claim 1 wherein said lacquer includes a matting agent.

6. A process as defined in claim 1 wherein said thermoplastic resinous composition is formed of a polymer of vinyl chloride or a copolymer vinyl chloride and another copolymerisable monomer.

7. A process as defined in claim 1 wherein said blowing agent is azobis-formamide.

8. A process as defined in claim 1 wherein said kicker is zinc octoate.

9. A process as defined in claim 1 wherein said lacquer is applied to said surface of said resinous sheet by means of a gravure roller.

10. A process as defined in claim 1 wherein said composition comprising ink and kicker is applied to said treated surface by means of a gravure roller.

11. A process as defined in claim 1 wherein the surface of said sheet for application to a substrate is provided with a coating of adhesive.

* * * * *